Nov. 22, 1949  R. J. SCHMERBER  2,488,987
AUTOMATIC MACHINE FOR ELECTRIC-ARC WELDING
Filed Nov. 18, 1946  3 Sheets-Sheet 2

INVENTOR
RAOUL J. SCHMERBER
BY Young, Emery & Thompson
ATTYS-

Nov. 22, 1949  R. J. SCHMERBER  2,488,987
AUTOMATIC MACHINE FOR ELECTRIC-ARC WELDING
Filed Nov. 18, 1946  3 Sheets-Sheet 3

INVENTOR
RAOUL J. SCHMERBER
BY Young, Emery & Thompson
ATTYS-

UNITED STATES PATENT OFFICE 2,488,987

AUTOMATIC MACHINE FOR ELECTRIC-ARC WELDING

Raoul Jean Schmerber, Uccle, Belgium, assignor to La Soudure Electrique Autogene, Societe Anonyme, Brussels, Belgium Application November 18, 1946, Serial No. 710,459
In Belgium November 22, 1945

6 Claims. (Cl. 314—73)

This invention relates to an automatic machine for electric-arc welding, in which a continuous metal electrode is moved with a translatory motion above the work and simultaneously advances towards said work, as it melts and in the direction of its axis, a feed movement for regulating the length of the arc relatively to the unevenness of the said work and/or of the voltage and the current in the arc.

Machines of this kind are well-known. They generally comprise a plurality of sources of direct current of different voltages, which are intended to supply a large number of motors and servo-motors operating a corresponding number of complicated members and/or mechanisms. All such mechanisms furthermore require numerous adjusting devices which are generally fragile and which further complicate the construction of the automatic machines of the kind referred to and substantially increase the cost of manufacture thereof.

The present invention provides an automatic machine for electric-arc welding, the operation of which is based on much simpler principles, offering advantages of lightness, ruggedness, and facility of operation in general, while enabling, in particular, automatic welds to be effected in a difficult position.

According to the invention, the automatic machine for electric-arc welding is only provided with a single source of alternating current supplying a motor for the translatory motion of the electrode above the work and the welding circuit, whose variations of current and of voltage control—automatically and by means of a second motor connected in parallel to the said welding circuit—the feed movement for regulating the length of arc of the electrode.

In other words, the machine according to the invention only uses two motors, one of which produces the translatory motion of the carriage carrying the welding head and the other the feed of the electrode in the said head and towards the work, while maintaining the suitable length of arc, by the sole effect of the characteristic variations of the alternating current flowing through the welding circuit.

The motor for the translatory movement of the carriage which moves the electrode longitudinally above the work may be directly connected to the source of alternating current, whereas across the secondary of a welding transformer are connected two separate rectified and filtered current circuits for supplying the second motor or motor for regulating the feed of the electrode, which is a direct current motor of the independent excitation type. One of the said rectified and filtered current circuits supplies the armature of said direct current motor, the other the independent excitation of the same.

It follows from this that these two circuits which respectively supply the armature of the feed-motor and the excitation of the said motor are influenced, when there is no load, solely by the alternating current voltage of the welding circuit and, when under load, by a conditioned proportional equilibrium between the values of the alternating welding current and the alternating current voltage of the arc.

As the feed regulation of the electrode depends on the speed of rotation of the corresponding motor, the voltage drop under load, which is inherent to any welding circuit, is, according to the invention, automatically compensated or influenced by an auxiliary voltage applied to the armature circuit of the feed motor, whereas its excitation circuit is influenced by the variations of the current flowing through the welding circuit and, on the other hand—when the machine is running light—by an auxiliary voltage automatically applied to the excitation circuit of the said motor, whereas its armature circuit is in parallel with the no-load voltage of the welding transformer.

This latter auxiliary voltage, which is automatically applied to the feed regulating motor—when the machine automatically changes from operation under load to no-load operation—is intended to prevent the stoppage of said motor, or irregularities of rotation of its armature, during no-load operation, and its functions will become apparent in the course of the description of the operation of the machine.

The invention furthermore provides that the shaft of the motor controlling the feed regulation of the electrode in the welding head, automatically and simultaneously imparts to said head a transverse rocking movement relatively to the direction of displacement of said carriage, the amplitude of said movement being adjustable according to the width or the thickness of the joint to be welded.

Furthermore and according to the invention, the mechanical device for regulating the feed of the electrode or welding head, through which the alternating welding current is supplied to the said electrode, is provided with means for enabling electrodes of various diameters to be inserted and/or moved automatically in the said head.

Finally, the adjustment of the translation of the carriage carrying the motor and the members for regulating the feed or welding head of the electrode, is effected by altering the speed ratio between the translation motor and a speed reducing mechanism for the control of a driving or an impelling roller for the said carriage on which is also mounted the said translation motor.

Other peculiarities and details of the invention will become apparent from the ensuing description made with reference to the drawings accompanying the present specification.

Figure 1:
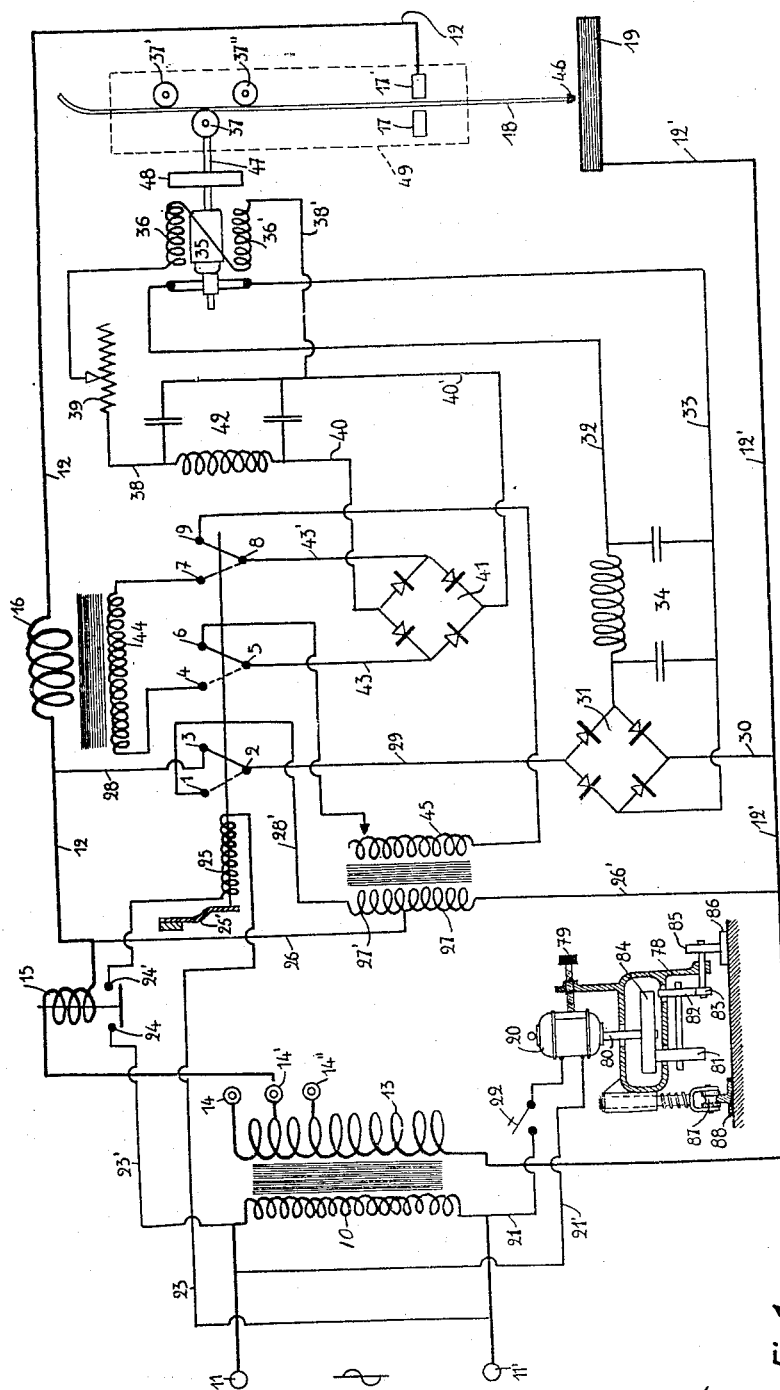
Fig. 1 shows a circuit diagram of an automatic machine for electric-arc welding according to the invention.

In Fig. 1, 10 is the primary of a welding transformer which is connected to the alternating current voltage 11—11'. The welding circuit 12—12' of the machine is connected, on the one hand and in known manner, to the secondary 13 of the welding transformer by means of one or other of the current adjusting tappings 14—14'—14". In said welding circuit 12—12' are connected in series the coil of a current relay 15, the primary 16 of a current transformer and two brushes 17—17' for supplying the welding current to the welding head, on the outer conducting surface of a continuous electrode 18 which can close the circuit 12—12' on the part to be welded or welding plate 19 which is connected, on the other hand, to the secondary 13 of the welding transformer.

20 is the translation motor for the carriage, directly connected to the alternating current voltage of the supply 11—11' through the circuit 21—21' containing a switch 22. Said motor 20—the functions of which will be more fully described hereinafter—may be quite an ordinary universal type series motor, the only special characteristic which it must have being a stable speed.

Similarly, a circuit 23—23' containing the contacts 24—24' of the current relay 15, is directly connected to the alternating current voltage 11—11' and said circuit is intended to supply the attraction coil 25 of an automatic reversing switch with three circuits, the respective contacts of which are designated by 1—3, 4—6, and 7—9 and the corresponding inputs by 2, 5 and 8. The position shown for said reversing switch is that of no-load operation. The reversing switch is permanently urged towards this position, for example, by a spring 25'.

Through 26—26' is directly connected across the welding circuit 12, 12' the primary winding 27 of an auxiliary transformer 27, 45. This primary winding serves simultaneously as a part of the secondary of an auto-transformer 27, 27+27', the secondary 27+27' of which is therefore shunted across the welding circuit. The secondary 27+27' of this auto-transformer 27, 27+27' may (by 28', the contact 1—2 closed, 29, 30 and 29') feed the current rectifier 31. The function of the secondary 45 of the auxiliary transformer 27, 45 will appear hereafter.

Through 28, 29 and 30, the closed contact 3—2 shunts the current rectifier 31 directly across the welding circuit, the output circuit 32—33 of said rectifier containing the choke-capacity system 34 which is intended, in known manner, to smooth the rectified current, and said output circuit 32—33 is normally connected to the terminals of the armature winding 35 of a motor with field winding 36—36'.

By means of its shaft 47 and of a speed reducer, the drive shaft of which is not shown in Fig. 1, said motor with independent excitation or motor for regulating the feed of the electrode, drives a set of feed rollers such as 37, 37', 37" provided in the welding head, other mechanical peculiarities of which will be described hereinafter.

The circuit 38—38' of the field winding 36—36' of the feed motor, includes the control rheostat 39 and is connected to the output circuit 40—40' of a rectifier 41, through the choke-capacity smoothing system 42. The input terminals of the rectifier 41 are connected, through 43—43', to the terminals 5 and 8 respectively corresponding to the contacts 4—6 and 7—9 of the aforesaid reversing switch.

The contacts 4 and 7 are connected to the two respective ends of the secondary 44 of the current transformer, the primary 16 of which, as already mentioned, is in series with the welding circuit 12—12'. On the other hand, the contacts 6 and 9 are connected to the secondary 45 of the auxiliary transformer 27, 45, the primary 27 of which, as already mentioned, is directly shunted across the welding circuit 12, 12'. Moreover, when the contacts 1, 2 are connected together, the secondary 27+27' of the auto-transformer 27, 27+27' supplies the current rectifier 31.

Since the primary winding 27 of the auto-transformer 27, 27+27' is subjected to a voltage directly proportional to the arc voltage of the welding circuit 12, 12', for a suitably chosen ratio between the number of turns of the windings 27 and 27', the secondary winding 27+27' may furnish an auxiliary voltage which rectified and filtered is about double the arc voltage.

In these conditions, the primary winding 27 performs the function of an auto-transformer having a voltage directly proportional to the arc voltage of the welding circuit 12—12' and, for a suitably chosen ratio 27—27' said winding can supply a rectified and smooth auxiliary voltage of about double the arc voltage.

The arrangement described operates as follows:

The members of the machine being assumed to be in the position for no-load operation, the rheostat 39 of the feed regulating motor is adjusted to a speed of feed of the electrode dependent on the gauge or diameter of said electrode and/or on the kind of joint to be welded. The kind of electrode used by the machine is a metal electrode which is adapted to receive the supply of welding current on its outer surface, for example, an electrode of the so-called "cored" type. The reversing switch (1—9) being open for no-load operation, as shown in the diagram of Fig. 1 the electrode 18, which is of indeterminate length and is supplied from a roll mounted on a reel, not shown, has first to be passed through the feed members 37, 37', 37" and through the electric contact members 17—17' of the welding head. This insertion of the electrode 18 in the welding head may be effected automatically. For this purpose, the welding circuit 12—12', which is connected at 14' for example, is energized by bringing into operation the welding transformer (10—13) by means of a switch or contact not shown in the drawing. As soon as the welding circuit is energized, the feed regulating motor starts rotating. The terminals of its armature winding 35 are supplied by the output circuit 32—33 of the rectifier-smoothing device 31—34 which is connected in parallel to the circuit 12—12' (through 28, 3—2, 29 and 30) whereas through 38—39 and 38', its field winding 36—36' is connected to the output circuit 40—40' of the rectifying-smoothing system 41—42 which is connected to the secondary 45 of the auxiliary transformer, the primary portion 27 of which is directly connected in parallel to the circuit 12—12' through 26 and 26'. The free end of the electrode being inserted through the upper part of the welding head, between the rotating rollers 37, 37', 37'', said rollers "suck in" said end and pass it between the electric contact brushes 17—17' and out through the lower part of the welding head. When the electrode has been thus engaged, the switch is operated to cut off the current from the welding transformer (10—13) and thereby stop the electrode feed motor. The free end of said electrode is then provided with a fuse 46, such as described in my copending patent application Serial No. 710,458 filed November 18, 1946, and now Patent Number 2,472,923, for: "Method for striking the welding arc in automatic electric-arc welding machines."

After this, the automatic welding operation can be started forthwith. The welding transformer (10—13) is switched on and starts again on no load the feed motor for the electrode 18 which is provided with the fuse 46. As soon as said fuse, as the electrode is fed, touches the work 19 and thus closes the welding circuit on the electrode 18 (through 14', 12, 18—19, 12', 13), it catches fire by Joule effect, as described in the aforesaid patent application.

The arc having been struck forthwith, the speed of the feed regulating motor increases, while acting to regulate the length of the welding arc which has been struck and the speed of operation under load is automatically obtained after a few tenths of a second during which care should be taken to close the switch button 22 of the translation motor 20 for the carriage. All the remainder of the operation has been automatically effected by the closing of the welding circuit 12—12' on the electrode 18, since the current relay 15 has operated and closed (through 23', 24—24' and 23) the circuit of the attraction coil 25 of the reversing switch (1—9), and this has connected to the rectifier-filter system 31—34, (through 28', 1—2, 29, 30, 12' and 26') the secondary 27+27' of the auto-transformer 27, 27+27'. The rectifier-filter system 31—34 feed through 32, 33 the armature winding 35 of the feed advancing motor. The reversing switch 1—9 has simultaneously connected (through 4—5, 43, 43' and 8—7) the secondary 44 of the current transformer 16, in order to supply the rectifying-smoothing system 41—42 to which is normally connected the field winding circuit (38, 39, 36—36', 38') of the feed regulating motor.

In this state of operation under load, it will be seen, on the one hand that the armature winding 35 of the feed regulating motor uses a value of auxiliary voltage which is directly proportional to the arc voltage and which may, as already mentioned, be double said arc voltage which, alone, is too weak to produce the requisite speeds of rotation of the armature winding 35 under load and, consequently, of the shaft 47 of the feed regulating motor, and, on the other hand that the excitation circuit of said motor is supplied with a voltage which is proportional to the welding current. In fact, if the welding current increases, the excitation voltage increases and, consequently, the speed of the motor decreases and the arc tends to become longer. Conversely, if the welding current decreases, the excitation voltage decreases, the speed of the motor increases and the arc is shortened. On the other hand, if the arc voltage tends to decrease (short arc), the speed of the motor decreases, the arc becomes longer and if the arc voltage tends to increase (long arc) the speed of the motor increases and the arc is shortened.

From this conditioned proportional equilibrium between the values of the alternating welding current and of alternating current arc voltage, is essentially obtained the automaticity of the regulation of the machine, for a constant length of arc which is predetermined by a sufficiently accurate adjustment of the rheostat 39 for the excitation of the motor regulating the feed of the electrode. However, in order to prevent small variations of length of the arc disturbing the regular operation of said motor, the shaft 47 of same is provided with a flywheel 48 which is intended to absorb, by its inertia, the very small speed variations and prevent "pumping" phenomena in the length of the arc.

However, apart from the fact that the machine should be able to use electrodes of various diameters in order to deposit strings of welds of different thickness and width, such width and also the quality and the appearance of said string depend also on the regularity of a swinging motion which the welding electrode, during its regulating feed towards the work, should be able to effect transversely to the direction displacement of said carriage.

Figure 2:
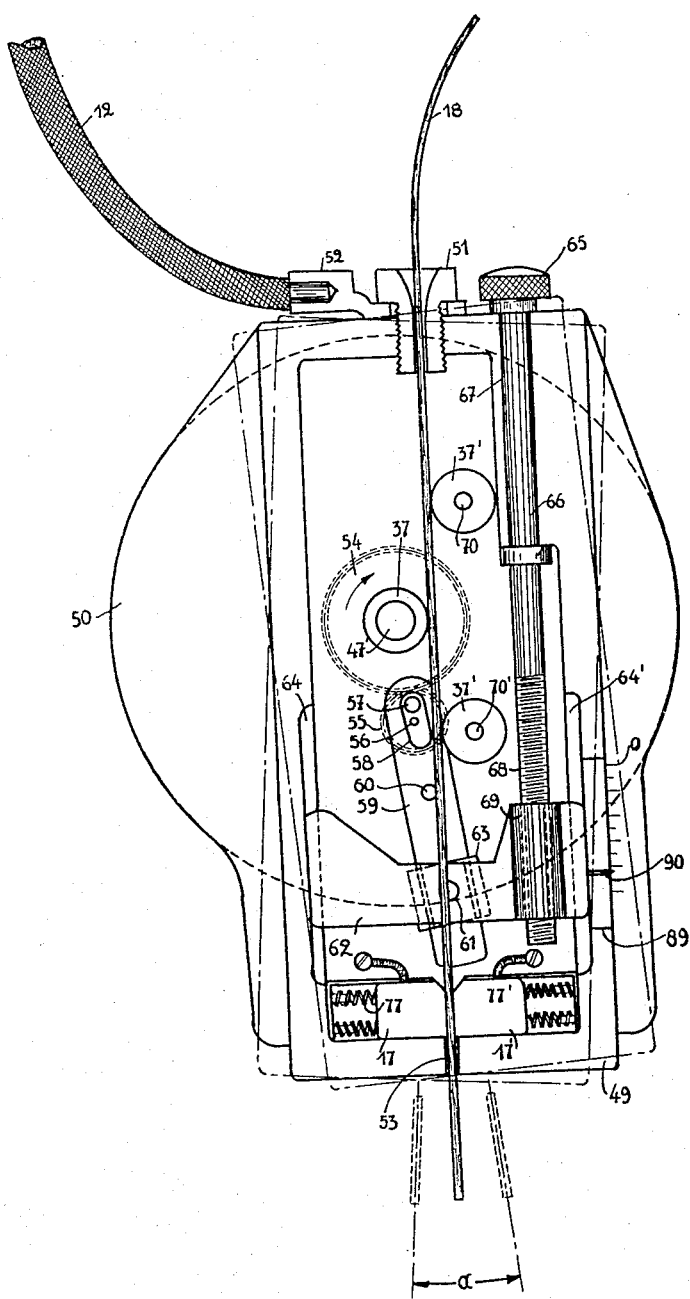
Fig. 2 shows diagrammatically the welding head with members and mechanisms for the automatic movement of the electrode.

For this purpose and as shown in Fig. 2, the welding head or its frame 49, is pivoted about the drive shaft 47' of an appropriate speed reducer not shown in the drawing and provided in a case 50 of the feed regulating motor whose shaft 47 (Fig. 1) drives the said speed reducer.

On the shaft 47' is mounted the driving roller 37 against which other rollers, such as 37' and 37'', which are loosely pivoted in the frame 49, press against the cylindrical surface of the electrode 18 so as to engage same firmly when, as already described, said electrode is automatically "sucked" into the welding head into which its free end is inserted through a bushing or wire guide 51. Said wire guide also acts as a nut for fixing the shoe 52 of a flexible cable 12 which is intended to connect electrically the frame 49 to the welding circuit and is none other than the portion 12 of said circuit, as shown diagrammatically in Fig. 1. On the lower part and in front of the outlet 53 of the welding head or frame 49, are mounted on springs graphite brushes 17 and 17' between which the end of the electrode is directed by the action of the set of rollers 37, 37', 37'' in order to effect the supply of the welding current to the electrode when the machine is operating under load.

Behind these members for regulating the feed of the electrode and on the spindle 47', is mounted a toothed wheel 54 which meshes with a pinion 55 which is pivoted at a fixed point 56 and an eccentric pin 57 of which engages the eye 58 of the upper end of a connecting rod 59 pivoted about a pivot 60 fixed on the bottom of the case 50.

Said connecting rod 59 forms a lever which has for its fulcrum the fixed pivot 60 and the upper part of which forms the arm, over the distance between the fixed pivot 60 and the pivot or axis 57, the bearing surface of said lever being formed by the lower part or end of the connecting rod 59. Said connecting rod is pivotally connected, at 61 for example, to the middle of a cross member 62 of the frame 49, so that by the rotation of the toothed wheel 54 and the consecutive rotation of the pinion 55 whose eccentric pin causes the connecting rod 59 to effect a reciprocating movement (about the fulcrum 60), the frame 49 can swing about the pivot 47' with an oscillatory movement, the amplitude α of which is directly proportional to the span of the lever which is determined by the distance between the fulcrum 60 and the point of pivotal connection 61.

In the embodiment shown, said pivotal connection is obtained by means of a guide collar 63 which is loosely pivoted on the movable cross member 62 forming a slider on guideways 64—64' provided on the two opposite sides of the frame 49 of the welding head. The lower end of the connecting rod 59 is engaged by the guide collar 63 in such a manner that said rod may be pivotally connected to the frame 49 in variable positions, by altering the length of the span of the lever arm which it forms and on which depends, as hereinbefore explained, the amplitude of the oscillations or swings of the frame or welding head 49.

Said amplitude can, according to the invention, be regulated and adjusted from outside the welding head. For this purpose, the knurled knob 65 of an adjusting screw 66 is acted on, the non-threaded upper portion of said screw being engaged and loosely rotatable in bearing 67 of the frame 49 of the welding head. The lower threaded portion 68 of said screw engages a corresponding threaded portion or sleeve 69 of the movable slider 62 and moves it along the guideways 64, 64' relatively to the said frame. In this manner, when the screw 66 is rotated in one direction in order to make the slider 62 move upwards, the span 60—61 is shortened, the amplitude α decreases, when the screw 66 is rotated in the other direction in order to make the slider 62 move downwards, the span 60—61 is lengthened and the amplitude α increases.

The slider 62 is provided with a needle or pointer 90 which passes through an opening 89 of the frame 49 and opposite which, as shown in Fig. 2, is a graduation. It will be seen that the amplitude of the swinging movement can thus always be adjusted beforehand on the graduation marked on the said scale. Said amplitude can be reduced to zero, i. e. the swinging may be eliminated. For this purpose, it is only necessary to rotate the knurled knob 65 until the centre of the pivot point 61 coincides with the centre 60 of the fulcrum of the lever formed by the connecting rod 59.

The rollers 37', 37" which are shown diagrammatically in Fig. 2, are, as already stated, loosely pivoted, but their respective spindles 70, 70' can, in known manner, press the electrode 18 against the driving roller 37 by the action of springs.

In order to make it possible to use the welding head for different diameters of welding electrodes, the respective spindles 70, 70' of the rollers 37', 37" are not secured to the frame 49. According to these diameters, it should be possible to move them away from the driving roller 37 against which the rollers 37', 37" press the cylindrical surface of the electrode 18. The arrangement used for this purpose by the invention, for these feed regulating members which are located opposite the members for swinging the welding head, which were described in the last place, has not been shown in Fig. 2, in order to make the drawing clearer.

Figure 3:
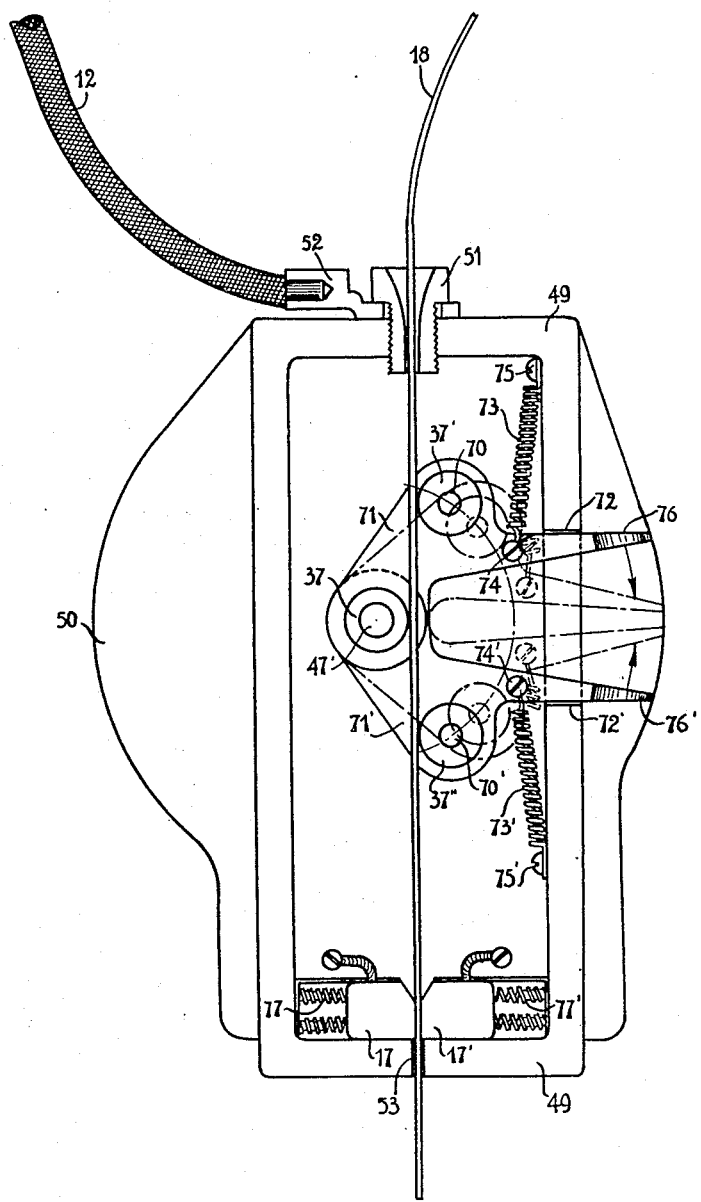
Fig. 3 shows diagrammatically an embodiment of said mechanism, enabling electrodes of various diameters to be passed through the welding head.

As shown diagramatically in Fig. 3, the spindles or pivots 70, 70' of the respective rollers 37', 37" are mounted on members 71, 71' forming a lever, which are fulcrumed and pivoted about the driving spindle 47', to which the driving roller 37 is secured. The arms of said levers 71, 71' pass through a lateral slit of the frame 49 and the upper part 72 and lower part 72' of said slit form abutments against which the arms of the levers 71, 71' can bear by the action of retracting springs 73, 73' which are fixed on the one hand to the levers at 74, 74', and on the other hand to the frame 49 at 75, 75'. The respective outer ends 76, 76' of the levers 71, 71' terminate in the shape of handles which, as shown in broken lines in Fig. 3, leaves the stops 72, 72' when they are moved towards one another, so that the spindles 70, 70' with their respective rollers 37' 37" describe, as they move towards one another, an arc of a circle and move to the common plane of tangency of the two pressure rollers 37', 37" away from the driving roller 37, thereby allowing an electrode 18 of any chosen diameter to pass. When the handles 76, 76' are released, the spindles 70, 70' tend to return towards their initial position, but before they have reached their respective abutments, the corresponding rollers 37', 37" press against the electrode 18 by the action of the pull of the retracting springs 73, 73'.

From that instant, the feed regulating motor is set in motion on no load, in order to feed the electrode automatically, as described, into the current supply members 17—17' and between which it is forced, against the action of a system of springs 77, 77', before issuing from the lower part of the frame 49 of the welding head. In order to enable the arc to be struck easily, this feed of the electrode under no load should be slow and, for this purpose, it is only necessary to fix, once and for all, the adjustment of the auxiliary voltage supplied on no load operation by the secondary 45 of the auxiliary transformer (Fig. 1).

Apart from this adjustment, the automatic machine according to the invention is only provided with three adjustments: that for the speed of feed of the welding electrode under load, by means of the rheostat 39, the adjustment of the swinging of the welding head, by means of the knob 65 as described and the adjustment of the translation of the carriage above the work.

For the purpose of this latter adjustment and according to the invention, the translation motor 29 (Fig. 1) is mounted on the carriage 78 in such a manner that it can be moved relatively to said carriage by means of a screw 79, whereas its shaft 80 rests on the driving wheel 81 of a speed reducing mechanism such as 82—83, through the intermediary of a plate 84 secured to the shaft 80. The plate 84 frictionally engages the wheel 81 of the speed reducer and said speed reducer drives a knurled driving roller 85 of the carriage 78 which can thus move along a track 86, whereas it rests on the other hand on three rollers such as 87 rolling on the rail 88. It will be seen that by acting on the screw 79, the engagement ratio between the plate 84 of the driving shaft 80 and the wheel 81 is altered. Consequently, the closer the axis of said driving shaft 80 moves towards the wheel 81, the slower becomes the translatory movement of the carriage above the work and, conversely, the further the driving shaft 80 moves away from the wheel 81 and engages it towards its periphery, the faster will be the movement of the carriage.

The three adjustments described are of course accessible on the translation carriage which, for the purpose described, also carries the feed regulating motor for the electrode which passes through the welding head.

What I claim is:

1. In an automatic arc welding machine utilizing alternating current supplied by a welding transformer for feeding the arc between an electrode which advances continuously towards the work by means of a direct current motor fed with rectified current derived from the alternating welding circuit, the combination of a single armature winding and a single field winding for said motor, a first rectifier for feeding the armature winding, means for connecting said first rectifier in parallel with the welding circuit, means for generating a source of alternating voltage by the passage of the welding current in the welding circuit, a second rectifier for feeding the field winding, means for connecting said second rectifier in parallel with the welding circuit when the latter is on no load and in parallel with said source of alternating voltage when the welding circuit is under load, a reversing switch for modifying the connections of the second rectifier on no load and under load, means for permanently urging said reversing switch towards the position on no load, and means for putting said reversing switch into the position under load under the influence of the passage of welding current in the welding circuit.

2. In an automatic arc welding machine utilizing alternating current supplied by a welding transformer for feeding the arc between an electrode which advances continuously towards the work by means of a direct current motor fed with rectified current derived from the alternating welding circuit, the combination of a single armature winding and a single field winding for said motor, a first rectifier for feeding the armature winding, means for connecting said first rectifier directly in parallel with the welding circuit on no load, of a transformer in parallel on the welding circuit supplying a higher voltage at its secondary than that received at its primary, means for connecting said first rectifier to the secondary of this last transformer under load, means for generating a source of alternating voltage by the passage of the welding current in the welding circuit, a second rectifier for feeding the field winding, means for connecting said second rectifier in parallel with the welding circuit when the latter is on no load and in parallel with said source of alternating voltage when the welding circuit is under load, a reversing switch for modifying the connections of the two said rectifiers on no load and on load, means for permanently urging said reversing switch towards the position on no load, and means for putting said reversing switch into the position under load under the influence of the passage of welding current in the welding circuit.

3. In an automatic arc welding machine utilizing alternating current supplied by a welding transformer for feeding the arc between an electrode which advances continuously towards the work by means of a direct current motor fed with rectified current derived from the alternating welding circuit, the combination of a single armature winding and a single field winding for said motor, a first rectifier for feeding the armature winding, means for connecting said first rectifier in parallel with the welding circuit, a current transformer, the primary of which is in the welding circuit, a second rectifier for feeding the field winding, means for connecting said second rectifier in parallel with the welding circuit when the latter is on no load and in parallel with the secondary of said current transformer when the welding circuit is under load, a reversing switch for modifying the connections of the second rectifier on no load and under load, means for permanently urging said reversing switch towards the position on no load, and means for putting said reversing switch into the position under load under the influence of the passage of welding current in the welding circuit.

4. In an automatic arc welding machine utilizing alternating current supplied by a welding transformer for feeding the arc between an electrode which advances continuously towards the work by means of a direct current motor fed with rectified current derived from the alternating welding circuit, the combination of a single armature winding and a single field winding for said motor, a first rectifier for feeding the armature winding, means for connecting said first rectifier in parallel with the welding circuit, means for generating a source of alternating voltage by the passage of the welding current in the welding circuit, a second rectifier for feeding the field winding, an auxiliary transformer in parallel with the welding circuit, means for connecting said second rectifier in parallel with the secondary of said auxiliary transformer when the welding circuit is on no load and in parallel with said source of alternating voltage when the welding circuit is under load, a reversing switch for modifying the connections of the second rectifier on no load and under load, means for permanently urging said reversing switch towards the position on no load, and means for putting said reversing switch into the position under load under the influence of the passage of welding current in the welding circuit.

5. In an automatic arc welding machine utilizing alternating current supplied by a welding transformer for feeding the arc between an electrode which advances continuously towards the work by means of a direct current motor fed with rectified current derived from the alternating welding circuit, the combination of a single armature winding and a single field winding for said motor, a first rectifier for feeding the armature winding, means for connecting said first rectifier in parallel with the welding circuit, means for generating a source of alternating voltage by the passage of the welding current in the welding circuit, a second rectifier for feeding the field winding, means for connecting said second rectifier in parallel with the welding circuit when the latter is on no load and in parallel with said source of alternating voltage when the welding circuit is under load, a reversing switch for modifying the connections of the second rectifier on no load and under load, an attraction coil for displacing said reversing switch under load, and a current relay for energizing said attraction coil when the welding circuit is under load.

6. In an automatic arc welding machine utilizing alternating current supplied by a welding transformer for feeding the arc between an electrode which advances continuously towards the work by means of a direct current motor fed with rectified current derived from the alternating current welding circuit, the combination of a single armature winding and a single field winding for said motor, an auto-transformer connected across the secondary of the welding transformer and designed so as to increase the voltage applied between the two extremities of its secondary, a first current rectifier for supplying the armature winding of said direct current motor, a second current rectifier for supplying said field winding, means for influencing said field winding by the variations of the welding current, an auxiliary transformer whose primary is a portion of the secondary of said auto-transformer, a current relay in the welding circuit, the contacts of this current relay being mounted in series with an attraction coil in a circuit across the primary of the welding transformer, and an automatic reversing switch with three switches actuated by said attraction coil, one of these switches being connected to one pole of the first current rectifier and being capable of coming in electrical contact, on no load, with the welding circuit on the side of the welding arc and, under load, with the secondary of the auto-transformer, a second of these three switches being connected to one pole of the second current rectifier and being capable of coming in electrical contact, on no load, with one end of the secondary of the auxiliary transformer and under load, with one pole of the means for influencing said field winding by the variations of the welding current, the third of these three switches being connected to the second pole of the second current rectifier and being capable of coming in electrical contact, on no load with the other end of the secondary of the auxiliary transformer and, under load, with the other pole of the means for influencing said field winding by the variations of the welding current.

RAOUL JEAN SCHMERBER.

REFERENCES CITED

The following references are of record in the file of this patent:

UNITED STATES PATENTS

| Number | Name | Date |
|---|---|---|
| 1,932,042 | Koch | Oct. 24, 1933 |
| 1,976,551 | Frick | Oct. 9, 1934 |
| 1,989,546 | Chapman | Jan. 29, 1935 |
| 2,025,785 | Southgate | Dec. 31, 1935 |
| 2,132,479 | Holslag | Oct. 11, 1938 |
| 2,160,048 | Wiley et al. | May 30, 1939 |
| 2,163,657 | Beckman | June 27, 1939 |

FOREIGN PATENTS

| Number | Country | Date |
|---|---|---|
| 439,900 | Great Britain | Dec. 17, 1935 |